Patented May 9, 1939

2,157,348

UNITED STATES PATENT OFFICE 2,157,348

PRODUCTION OF ALIPHATIC VINYL ETHERS BY MEANS OF ACETYLENE

Walter Reppe and Otto Hecht, Ludwigshafen-on-the-Rhine, Germany, assignors to I. G. Farbenindustrie Aktiengesellschaft, Frankfort-on-the-Main, Germany No Drawing. Application September 18, 1937, Serial No. 164,498. In Germany August 24, 1935

5 Claims. (Cl. 260—488)

This application is a continuation-in-part application of our application Ser. No. 95,036 filed August 8, 1936. In Example 5 of our copending application Ser. No. 95,036 there is described that a mixture of ethylidene acetals of glucose and fructose can be reacted with acetylene in the presence of calcined zinc acetate and quinoline at elevated temperatures in the liquid phase to form the corresponding vinyl ethers.

We have now found that vinyl ethers are generally obtained by treating alcohols with acetylene at elevated temperature in the presence of zinc or cadmium salts of organic acids in the liquid phase. As suitable zinc and cadmium salts there may be mentioned for example the salts of formic acid, acetic acid and butyric acid; the salts of carboxylic acids of high molecular weight, such as alpha-methylvaleric acid, stearic acid, oleic acid, abietic acid and naphthenic acids are especially suitable. In many cases it is preferable, in order to accelerate the reaction and improve the yields, to use the zinc and cadmium salts in combination with tertiary heterocyclic bases, such as pyridine or quinoline, or with ammonia. The process is applicable generally to compounds containing at least one free alcoholic hydroxyl group. It is especially valuable for the preparation of vinyl ethers from alcohols containing not only hydroxyl groups but also sensitive radicals or groups, such as partially etherified or acetalized sugars containing at least one free hydroxyl group, as for example tetramethylglucose, beta-diacetone-fructose, mono-acetone-glucose or a mixture of beta-diacetone-fructose and diacetone-glucose, such as is formed by the treatment of cane sugar with acetone and sulphuric acid, or the corresponding methylene, ethylidene and benzylidene acetals, and alcohols containing ester groups, such as hydroxy-fatty acid esters and mono- or poly-fatty acid esters of polyhydric alcohols, as for example glycollic acid esters, glycol mono-acetate or glycerine diacetate. The preparation of vinyl ethers from alcohols containing ester groups in the molecule at the same time is impossible by the known processes in which strong alkalies are used as catalysts because the ester groups are saponified by the alkali during the reaction. By the process according to this invention it is possible for the first time also to convert the said alcohols into vinyl ethers by the action of acetylene.

The process may be carried out at temperatures of from about 120° to about 200° C., but it is preferable to work at temperatures of from 150 to 180° C.

When working with glycerine diacetate, in addition to the adding on of acetylene to the hydroxyl group, there takes place to a great extent a replacement of one acetic acid radicle by the vinyl group so that glycerine monoacetate-divinyl ether is mainly obtained.

The following examples will further illustrate the nature of this invention but the invention is not restricted to these examples. The parts are by weight.

Example 1

15 parts of dehydrated cadmium acetate are added to 500 parts of diethylene glycol monoethyl ether and the whole treated in a pressure-tight vessel while stirring with a mixture of 1 part of nitrogen and 2 parts of acetylene under a pressure of from 10 to 20 atmospheres at 180° C. until no further acetylene is absorbed during a period of about 2 hours. The reaction product boils at from about 85° to 110° C. at a pressure of 12 millimetres (mercury gauge). In addition to a little unchanged diethylene glycol monoethyl ether it contains mainly the vinyl ether of the same having the formula:

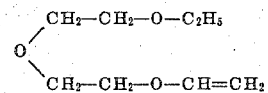

which may be purified in known manner by fractional distillation.

Example 2

104 parts of glycol monoacetate are treated with acetylene at from 150° to 170° C. in the manner described in Example 1 in the presence of 20 parts of zinc naphthenate (having a mean molecular weight of 270). By distilling the reaction product at a pressure of from 0.1 to 0.3 millimetre (mercury gauge) there is obtained a fraction passing over at from 32° to 40° C. from which by repeated distillation the vinyl ether of glycol monoacetate may be isolated in pure form. This boils at from 39.5° to 41.5° C. under a pressure of 0.2 millimetre (mercury gauge). The refractive index of the pure vinyl ether is $$n_D^{20} = 1.4250$$

and the density is $d_{20} = 1.0121$.

The zinc salt of alpha-methylvaleric acid may be used as catalyst in the same way instead of zinc naphthenate.

Example 3

88 parts of glycerine diacetate having a boiling point of from 122° to 125° C. at a pressure of from 0.2 to 0.3 millimetre (mercury gauge) and a refractive index of $$n_D^{20} = 1.4410$$

are treated with acetylene at from about 148° to about 170° C. in a manner similar to that described in Example 1 in the presence of 7 parts of zinc naphthenate (mean molecular weight 270). More than 1 molecular proportion of acetylene is absorbed for each molecular proportion of glycerine diacetate.

By distilling the reaction product at a pressure of from 0.2 to 0.5 millimetre (mercury gauge) there first passes over at from 64° to 66° C. a product having a refractive index of $$n_D^{20} = 1.4320$$

and containing a mixture of mainly glycerine monoacetate divinyl ether and a little glycerine diacetate monovinyl ether. By distilling the residue under a pressure of 0.15 millimetre (mercury gauge) a fraction is obtained between 72° and 80° C. which contains, in addition to a little glycerine monoacetate divinyl ether, mainly glycerine diacetate monovinyl ether. This fraction has a refractive index of $$n_D^{20} = 1.4360$$

By further heating at a pressure of 0.2 millimetre (mercury gauge) there is obtained at from 98° to 124° C. yet another fraction having a refractive index of $$n_D^{20} = 1.4390$$

consisting of about half of glycerine diacetate monovinyl ether, the remainder being unchanged initial material.

Example 4

135 parts of concentrated sulphuric acid are allowed to drop slowly while cooling to a mixture of 525 parts of finely powdered sugar and 825 parts of paraldehyde, the temperature not being allowed to rise above 30° C. The reaction mixture is then stirred for from 20 to 30 hours while cooling with ice, poured onto ice and neutralized to litmus by means of caustic soda solution. 300 parts of butanol are introduced in order to obtain a better separation of the aqueous layer containing sodium sulphate from the layer containing the acetal mixture formed. After allowing to stand for a long time, separation into three layers takes place. The lower layer consists of saturated sodium sulphate solution, the upper layer consists of water and the central layer contains the mixture of the ethylidene acetals of glucose and fructose formed, and also water, paraldehyde and butanol. The said readily volatile substances are removed therefrom by distilling first under a pressure of from about 50 to 100 millimetres, and then under a pressure of about 5 millimetres (mercury gauge). The acetals remain as a colorless to pale yellow syrup.

39 parts of pure freshly distilled quinoline and 3.5 parts of dehydrated zinc acetate are added to 70 parts of the said acetal mixture. The mixture is then treated at from 153° to 168° C. under pressure with acetylene diluted with nitrogen. The absorption of acetylene corresponds to the amount calculated for the monovinyl compounds of diethylidene glucose and diethylidene fructose. The vinyl ether mixture formed can be distilled only with difficulty because the ethylidene radicles are split off in part during the distillation by reason of a certain tendency to decomposition of the products. The main fraction boils at from 145° to 156° C. under a pressure of 4 millimetres (mercury gauge) and has the refractive index $$n_D^{20} = 1.474$$

and is a yellowish to brownish liquid.

What we claim is:

1. In the production of vinyl ethers from alcohols and acetylene, the step which comprises treating in the liquid phase an aliphatic alcohol with acetylene at temperatures of between 120 and 200° C. in the presence of a salt of an organic acid and a metal selected from the group consisting of zinc and cadmium.

2. In the production of vinyl ethers from alcohols and acetylene, the step which comprises treating in the liquid phase an aliphatic alcohol with acetylene at temperatures of between 120 and 200° C. in the presence of a salt of an organic acid and a metal selected from the group consisting of zinc and cadmium and a tertiary heterocyclic base.

3. In the production of vinyl ethers from alcohols and acetylene, the step which comprises treating in the liquid phase an acetalized sugar having at least one free hydroxyl group with acetylene at temperatures of between 120 and 200° C. in the presence of a salt of an organic acid and a metal selected from the group consisting of zinc and cadmium.

4. In the production of vinyl ethers from alcohols and acetylene, the step which comprises treating in the liquid phase a partially esterified polyvalent aliphatic alcohol containing ester groups with acetylene at temperatures of between 120 and 200° C. in the presence of a salt of an organic acid and a metal selected from the group consisting of zinc and cadmium.

5. Ethylene glycol acetate vinyl ether.

WALTER REPPE.
OTTO HECHT.